(12) United States Patent
Cheng (10) Patent No.: US 7,973,523 B2
(45) Date of Patent: Jul. 5, 2011

(54) REVERSE CURRENT SENSING REGULATOR SYSTEM AND METHOD

(75) Inventor: Dongjie Cheng, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 363 days.

(21) Appl. No.: 12/364,229

(22) Filed: Feb. 2, 2009

(65) Prior Publication Data

US 2010/0194370 A1     Aug. 5, 2010

(51) Int. Cl.
*G05F 1/40* (2006.01)

(52) U.S. Cl. .......................... 323/284; 323/285

(58) Field of Classification Search .................. 323/225, 323/282–285, 290
See application file for complete search history.

(56) References Cited

U.S. PATENT DOCUMENTS

| | | | | |
|---|---|---|---|---|
| 6,998,828 B2* | 2/2006 | Casey et al. | ..... | 323/284 |
| 7,652,456 B2* | 1/2010 | Hojo | ..... | 323/276 |
| 7,701,188 B2* | 4/2010 | Kojima | ..... | 323/284 |
| 7,812,580 B2* | 10/2010 | Watanabe et al. | ..... | 323/268 |
| 7,872,461 B2* | 1/2011 | Yamada | ..... | 323/284 |

\* cited by examiner

*Primary Examiner* — Jessica Han
(74) *Attorney, Agent, or Firm* — Dawn V. Stephens; Wade James Brady, III; Frederick J. Telecky, Jr.

(57) ABSTRACT

A reverse current sensing (RCS) regulator system and method is provided. One embodiment of the invention includes a RCS regulator system. The system comprises a RCS comparator that monitors a drain voltage of a LS FET and is configured to switch states at a zero crossing point to provide an indication of the start of a reverse current condition. The system further comprises a RCS evaluator that measures a drain voltage of the LS FET upon receiving an indication that the LS FET has been turned off by the driver logic circuit and adjusts an offset to the RCS comparator to adjust the trip point of the RCS comparator relative to the drain voltage if the measured drain voltage falls outside a predetermined threshold.

20 Claims, 5 Drawing Sheets

REVERSE CURRENT SENSING REGULATOR SYSTEM AND METHOD

TECHNICAL FIELD

This invention relates to electronic circuits, and more specifically to reverse current sensing regulator system and method.

BACKGROUND

A switching regulator typically employs a high side metal-oxide semiconductor field effect transistor (MOSFET) (HS FET) and a low side MOSFET (LS FET) to switch power and to provide current to an output inductor that is normally providing current in the direction of an output load. If the current goes backward from load, through LS FET, to ground, it is termed as a reverse current, which dissipates electrical energy stored in an output capacitor coupled to the output inductor. To improve power efficiency, this typical regulator can have a reverse current sensing (RCS) circuit to reduce or eliminate the reverse current. RCS offers a secondary benefit to the regulator's fault protection. If there is a short between battery VCC and the output, there would be large or even damaging reverse current going through LS FET. The RCS function can detect this short condition and turn off LS FET.

Ideally an RCS function should shut off LS FET at the onset of current reversal. However, in applications where the output inductor is small, the load voltage is high and the switching frequency is fast, an RCS circuit can have large errors associated with its limited response time and propagation delay of the LS FET driver. At the time LS FET is shut off by RCS function, reverse current may already overshoot to an unacceptable degree. This delay-caused error can significantly compromise the efficiency of the regulator. A straight forward solution to the issue seems to be introducing a certain amount of offset to the RCS function, such that it would react to reverse current somewhat earlier to compensate for the propagation delay. However, this design-in-offset approach is often not practical as it is limited to known application voltages and components. In reality the application condition may be unknown during the product design phase.

SUMMARY

In one aspect of the invention, a reverse current sensing (RCS) regulator system is provided. The system comprises a driver logic circuit that switches between alternately turning on and off a high side field effect transistor (HS FET) and a low side field effect transistor (LS FET) to provide an inductor current through an inductor and to charge a capacitor and provide a regulator output voltage to a load. The system further comprises a RCS comparator that monitors a drain voltage of the LS FET and is configured to switch states at a zero crossing point to provide an indication of the start of a reverse current condition, and a RCS evaluator that measures a drain voltage of the LS FET upon receiving an indication that the LS FET has been turned off by the driver logic circuit and adjusts an offset to the RCS comparator to adjust the trip point of the RCS comparator relative to the drain voltage if the measured drain voltage falls outside a predetermined threshold.

In another aspect of the invention, a RCS regulator system is provided that comprises means for alternately turning on and off a HS FET and a LS FET to provide an inductor current through an inductor and to charge a capacitor and provide a regulator output voltage to a load. The system further comprises means for monitoring a drain voltage of the LS FET and providing an indication of a start of a reverse current condition, means for measuring a drain voltage of the LS FET upon receiving an indication that the LS FET has been turned off in response to the indication of the start of a reverse current condition and means for determining if the measured drain voltage falls outside a predetermined threshold. The system also comprises means for providing a trim control signal if the means for determining determines that the measured drain voltage falls outside the predetermined threshold and means for providing an offset based on the trim control signal to the means for monitoring to adjust the trip point of the means for monitoring relative to the drain voltage.

In yet a further aspect of the invention, a method of calibrating a reverse current sensing regulator system is provided that alternately turns on and off a HS FET and a LS FET to provide an inductor current through an inductor and to charge a capacitor and provide a regulator output voltage to a load. The method comprises monitoring a drain voltage of the LS FET to determine if the drain voltage has crossed a zero crossing point, providing an indication of the start of a reverse current condition if the drain voltage has crossed the zero crossing point and measuring a drain voltage of the LS FET upon receiving an indication that the LS FET has been turned off in response to the indication of the start of a reverse current condition. The method further comprises determining if the measured drain voltage falls outside a predetermined threshold and providing an offset relative to the drain voltage to adjust the trip point determination of the zero crossing point if the measured drain voltage falls outside a predetermined threshold.

DETAILED DESCRIPTION

The present invention relates to electronics, and more specifically to a low-cost, high-accuracy automatic self calibrating reverse current sensing (RCS) regulator system and method that operates over a wide range of regulator applications.

Figure 1:
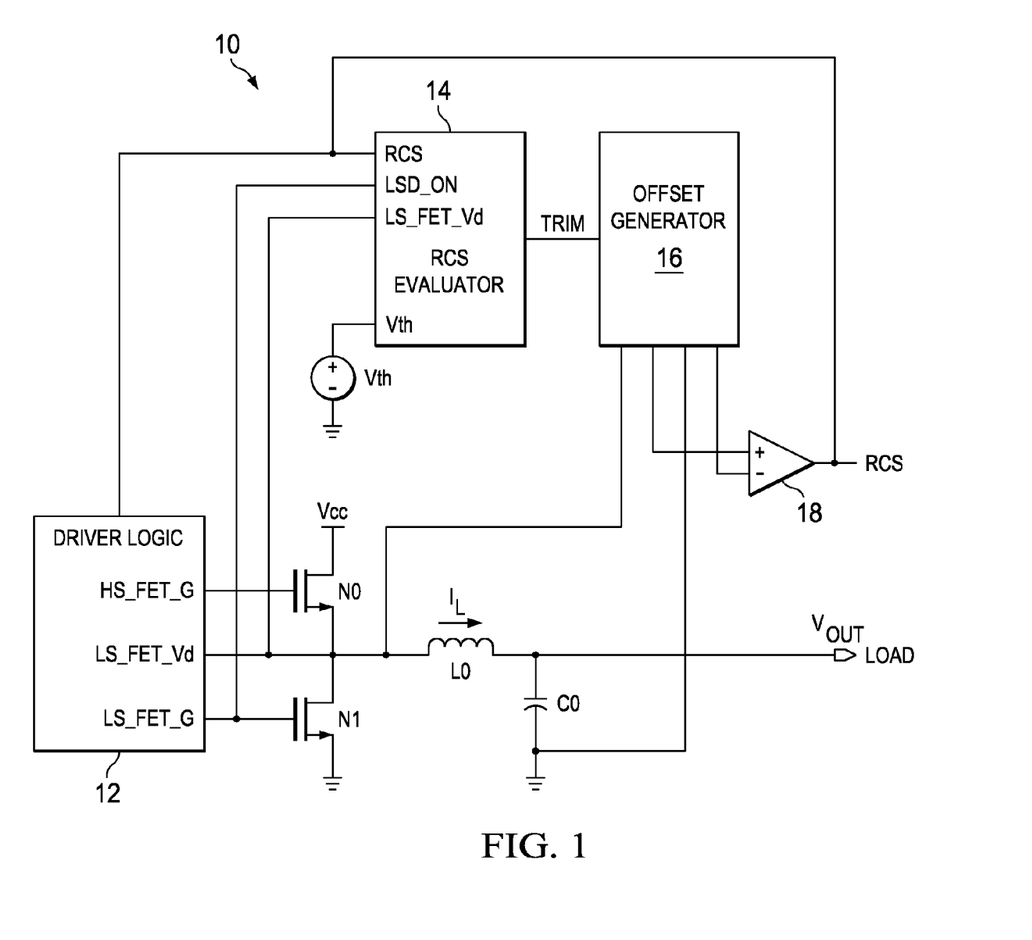
FIG. 1 illustrates an automatic self calibrating RCS regulator system in accordance with an aspect of the present invention.

FIG. 1 illustrates an automatic self calibrating RCS regulator system 10 in accordance with an aspect of the present invention. The system 10 comprises a driver logic circuit 12 that switches between alternately turning on and off a high side metal-oxide semiconductor field effect transistor (MOSFET) (HS FET) (N0) and a low side MOSFET (LS FET) (N1) to provide an inductor current $I_L$ through an inductor L0 and to charge a capacitor C0 and provide a regulator output voltage $V_{OUT}$ to a load (not shown). A RCS comparator 18 monitors a drain voltage LS_FET_VD of the LS FET N1. In a light load condition, when HS FET N0 turns off and LS FET N1 turns on, inductor L0 current $I_L$ first flows forward (from ground to output load) and gradually decays to zero and starts to reverse its direction (from output load back to ground). This corresponds to the process that LS_FET_VD is first negative and approaches zero and finally becomes positive causing a reverse current through the inductor L0 and LS FET N1. The RCS comparator 18 is configured to switch states (low to high) at the zero crossing point to provide an indication of the start of a reverse current, which is termed as an RCS event. Whenever an RCS event is detected, the driver logic circuit 12 turns off the LS FET N1 until the next switching cycle. An RCS function of monitoring for a RCS event and turning off the LS FET N1 until the next switching cycle can be performed employing a variety of different circuit function techniques.

The system 10 includes an RCS evaluator 14 and an offset generator 16. At power up, the RCS evaluator 14 resets its logic states, letting the RCS comparator 18 operate at an design default offset (e.g., zero volts). A first RCS event activates the automatic calibration process of the system 10. At this point, the RCS evaluator 14 measures LS_FET_VD upon receiving an indication that the LS FET has been turned off by the RCS function in the drive logic circuit 12. If the measured LS_FET_VD is reasonably close to zero, the RCS error is negligible, and the RCS evaluator 14 and the offset generator 16 take no action except for maintaining the existing calibration trim setting of the offset generator 16 and monitoring for the next RCS event.

In normal cases, if the measured LS_FET VD is not zero but higher than an accurate voltage reference Vth, a reverse current overshoot (RCS error) has been detected. The RCS evaluator 14 then upgrades the calibration trim setting, through the offset generator 16, to set the RCS comparator 18 to operate with more offset, so the RCS comparator 18 will trip earlier in the following RCS events to correct for overshoot. This causes the voltage on the input terminal of the RCS comparator 18 to increase relative to the LS_FET_VD, such that the comparator will trip at a trip point where LS_FET_VD is below ground. After each LS_FET_VD measurement followed by immediate trip point adjustment (if needed), the RCS evaluator checks the effect of trimming by repeating the evaluate-trim cycle until an extreme trim setting is reached, such that the measured LS_FET_VD is not higher than the accurate voltage reference Vth or a timer (one-shot) indicates a time out has occurred. Then the RCS evaluator 14 latches the final trim setting and becomes inactive. This trim-at-power up procedure not only saves power but also take advantage of the initial quieter time for calibration.

In a rare and opposite case, if the measured LS_FET_VD is not zero but lower than a reference voltage, a reverse current undershoot (also RCS error) is detected (this could happen through over-trim for comparator offset in design). The RCS evaluator 14 immediately downgrades the trim setting, so that the RCS comparator 18 will operate with less offset. The RCS comparator 18 thus will trip later to correct the undershoot error.

Figure 2:
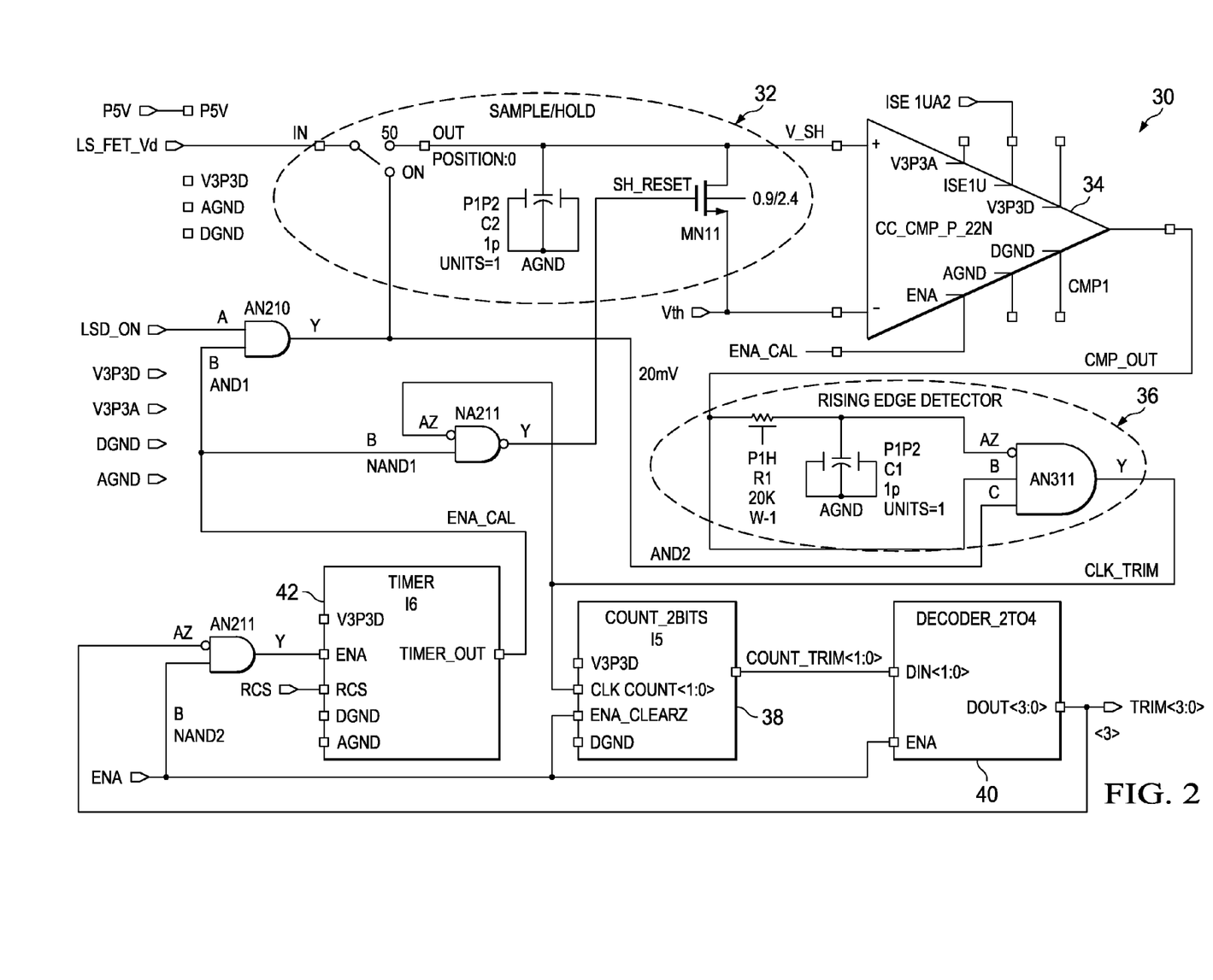
FIG. 2 illustrates an exemplary RCS evaluator in accordance with an aspect of the present invention.

FIG. 2 illustrates an exemplary RCS evaluator 30 in accordance with an aspect of the present invention. Reverse current overshoot is the most common error in an RCS function. Although, LS_FET_VD zero-crossing can be easily and accurately detected with a voltage comparator, it is the propagation delay for turning off the LS FET that causes the overshoot. The RCS evaluator 30 implemented in FIG. 2 handles this overshoot case. Shortly after power up of a system regulator, the system regulator normally experiences a brief light load period and RCS events will therefore be encountered. The first RCS event activates a timer 42 and triggers RCS automatic calibration, indicated by signal ENA_CAL=high and setting one input of sample control logic gate (AN210) to high. A sample/hold unit 32 comprising a sample switch S0, hold capacitor C2 and reset switch MN11 is coupled to a positive input terminal of a comparator 34. Applying a sample/hold stage into the RCS evaluator provides measurement immunity to interference from noise and circuit propagation delay. The switch S0 can be designed to block high voltage and cancel charge injection during switching. When LS FET is on (LSD_ON), the sample switch S0 is open. When the LS FET turns off the sample switch S0 closes and stores LS_FET_VD into hold capacitor C2. Thus C2 contains information of the accuracy of the RCS function and is compared to a reference voltage Vth (e.g., 20 mv) that is coupled to a negative input terminal of the comparator 34. If the reverse current has a detectable overshoot, i.e., LS_FET_VD>Vth, an output (CMP_OUT) of the comparator 34 goes high.

The output of the comparator 34 is coupled to an input of a rising edge detector 36. The rising edge detector 36 includes a resistor R1, a capacitor C1 and a three input logic gate (AN311). Through the rising edge detector, the CMP_OUT transition produces a pulse called CLK_TRIM to advance a counter 38 by one count and resets the sample and hold circuit 32 via a logic gate (NA211) and the reset switch MN11. The counter 38 provides a counter count trim value (COUNT_TRIM) to a decoder 40, which provide a TRIM control signal to an offset generator for setting an offset value. The RCS evaluator 30 checks the effect of trimming by repeating the evaluate-trim cycle until an extreme trim setting is reached turning off the timer 42 through logic gate (AN211) or a time out of the timer 42. Then the RCS evaluator 30 latches the final trim setting and becomes inactive. Without overshoot, i.e., Vd<Vth, the count remains unchanged.

As pointed out earlier, there maybe a rare case where we need to detect undershoot and to adjust the RCS comparator to trip later. To make the automatic calibration circuit handle this case, the counter 38 can be an up/down counter and a window comparator can be employed with or without the comparator 34. If an overshoot condition is detected, the up/down counter counts up and in the case that there is an undershoot condition, the up/down counter counts down. The functionality of the circuitry of the RCS evaluator 30 remains the same.

Figure 3:
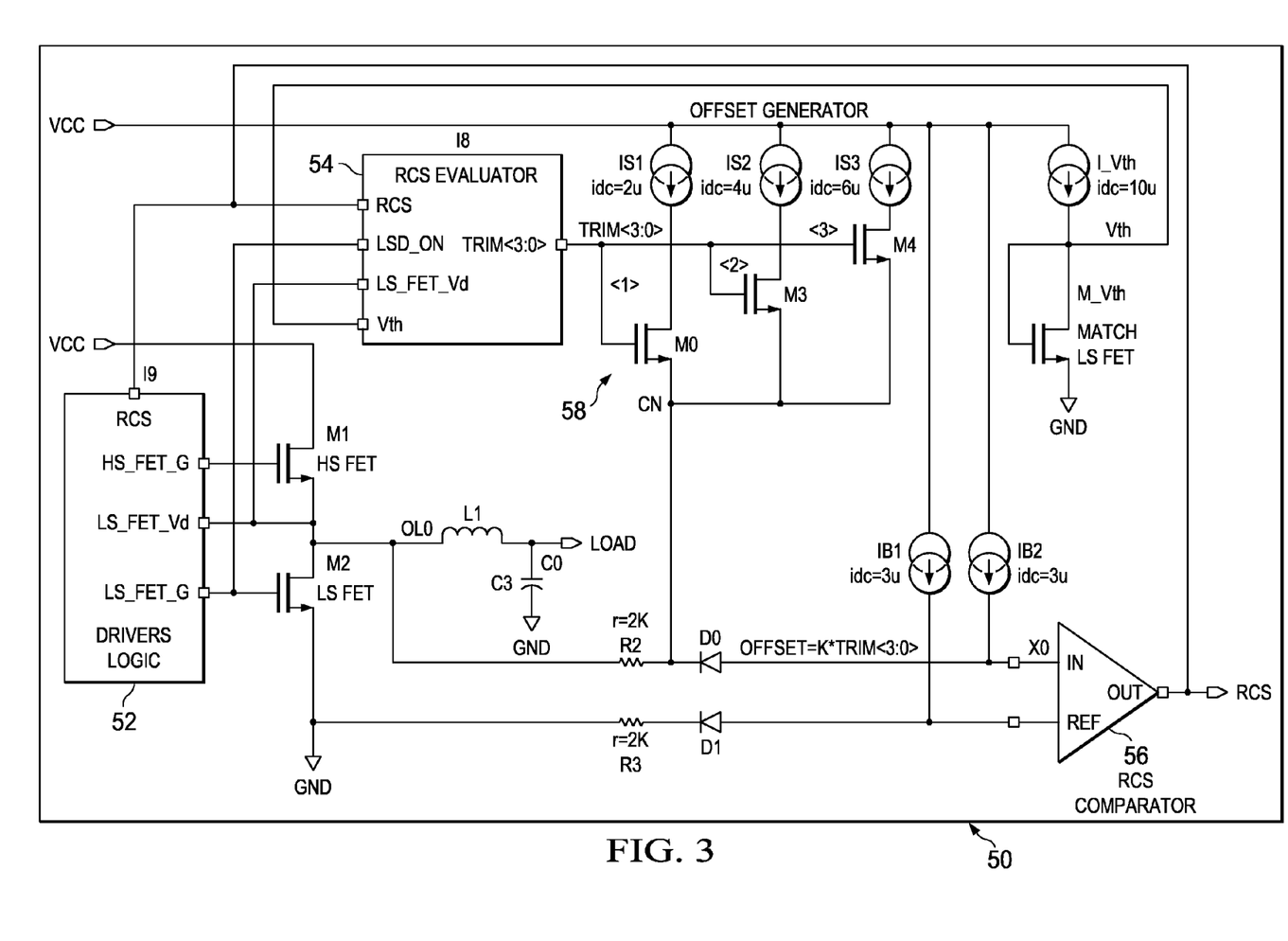
FIG. 3 illustrates an automatic self calibrating RCS regulator system employing one particular offset generator implementation in accordance with an aspect of the present invention.

FIG. 3 illustrates an automatic self calibrating RCS regulator system 50 employing one particular offset generator implementation in accordance with an aspect of the present invention. The system 50 comprises a driver logic circuit 52 that switches between alternately turning on and off a high side MOSFET (HS FET) M1 and a low side MOSFET (LS FET) M2 to provide an inductor current through an inductor L1 and to charge a capacitor C3 and provide a regulator output voltage to a load (not shown). A RCS comparator 56 monitors the drain voltage LS_FET_Vd of the LS FET M2 and is configured to switch states (low to high) at the zero crossing point to provide an indication of the start of an RCS event. Whenever an RCS event is detected, the driver logic circuit 52 turns off the LS FET M2 until the next switching cycle. The system 50 includes a RCS evaluator 54 similar to the RCS evaluator of FIG. 1 and an offset generator 58. The offset generator 58 is configured to provide appropriate offset to the RCS comparator 56 and provides the reference voltage Vth. The reference voltage Vth is provided by a current source I_Vth and a matching transistor M_Vth. The matching transistor M_Vth is matched to the LS FET M2. Vth is generated by forcing an accurate current, I_Vth, into transistor M_Vth. Vth should be accurate and insensitive to PVT variations. To this end, I_Vth can be trimmed to a design spec and zero TC during IC production test and transistor M_Vth is designed to match LS FET. If the LS FET Rds(on) is 0.2 ohm nominal, the maximum allowed RCS overshoot current is 100 mA, then RCS comparator trip point is determined by Vth=0.2 ohm*100 mA=20 mV. In the FIG. 3 example, I_Vth=10 uA, so Rds(on) of M_Vth should be 2 k ohm.

The offset generator 58 includes current sources IS1, IS2 and IS3 that provide offset currents with increasing values. The current sources IS1, IS2, IS3 are coupled at one end to a supply voltage VCC and at the other end to a common node (CN) through respective trim control transistors M0, M3 and M4. The common node CN is coupled to LS_FET_VD of the LS FET through a resistor R2. An anode of a diode D1 is coupled to a positive input terminal of the RCS comparator 56 and the cathode is coupled to the common node CN. An anode of a diode D2 is coupled to a negative input terminal of the RCS comparator 56 and the anode of the diode D2 is coupled to ground through a resistor R3. A current source IB1 is coupled between the supply voltage VCC and the negative input terminal of the RCS comparator 56 and a current source IB2 is coupled to a positive input terminal of the RCS comparator 56. The current sources IB1, IB2, diodes D0, D1 and resistors R2 and R3 are matched such to provide equal offsets to the positive and negative input terminals of the RCS comparator 56 as the design default offset at initialization of the system 50. IB1 and IB2 provide necessary DC bias to level-shifting diodes D0 and D1, without which it is difficult for the comparator 56 to sense a high speed negative voltage of LS_FET_VD. D0 can also aid in high voltage protection and clamping. R2 and R3 can also be employed in ESD and latch up protection.

In the present example, IB1=IB2=3 μamps and R2=R3=2 Kohms, such that an offset of 0.706 Volts (diode drop (0.7)+ Resistor drop (3 μamps*2 Kohms)) is added to ground at the negative input terminal of the RCS comparator 56 and to the LS_FET_VD at the positive input terminal of the RCS comparator 56. In this manner, the RCS event should occur at 0 volts at the initialization setting since the same offset has been added to both input terminals of the RCS comparator 56.

At power up, the RCS evaluator 54 resets its logic states, letting the RCS comparator 56 operate at an design default offset (e.g., zero volts). That is each of the trim control transistors M0, M3 and M4 are off and the same offset voltage is provided at both input terminals of the RCS comparator by the current sources IB1 and IB2. A first RCS event activates the automatic calibration process of the system 50. At this point, the RCS evaluator 54 measures LS_FET_VD upon receiving an indication that the LS FET has been turned off by the RCS function in the drive logic circuit 52. If the measured LS_FET_VD is reasonably close to zero, the RCS error is negligible, and the RCS evaluator 54 and the offset generator 58 take no action except for maintaining the existing calibration trim setting of the offset generator 58 and monitoring for the next RCS event. If the measured LS_FET_VD is not zero but higher than the accurate voltage reference Vth, a reverse current overshoot (RCS error) has been detected. The RCS evaluator 54 then upgrades the calibration trim setting, through the offset generator 58 turning on M0 and providing an adding 2 μA to IB2 through R2 causing the LS_FET_VD trip point to be 4 mV below ground and the voltage on the input terminal of the RCS comparator 56 to increase relative to the LS_FET_VD by 0.710 volts.

The RCS evaluator 54 checks the effect of trimming by repeating the evaluate-trim cycle. If the measured LS_FET_VD is not zero but higher than the accurate voltage reference Vth, the RCS evaluator 54 then upgrades the calibration trim setting, through the offset generator 58 turning off M0 and turning on M3 and adding 4 μA to IB1 through R2 causing the LS_FET_VD trip point to be 8 mV below ground and the voltage on the input terminal of the RCS comparator 56 to increase relative to the LS_FET_VD by 0.712 volts. The RCS evaluator 54 can the checks the effect of trimming by repeating the evaluate-trim cycle. If the measured LS_FET_VD is not zero but higher than the accurate voltage reference Vth, the RCS evaluator 54 then upgrades the calibration trim setting, through the offset generator 58 turning off M3 and turning on M4 and providing an adding 6 μA to IB2 through R2 causing the LS_FET_VD trip point to be 12 mV below ground and the voltage on the input terminal of the RCS comparator 56 to increase relative to the LS_FET_VD by 0.716 volts. Then the RCS evaluator 54 latches the final trim setting and becomes inactive.

The current sources IS1, IS2 and IS3 can be accurately trimmed during production testing to cancel out manufacturing variations of R2 and have virtually zero temperature coefficients (TC). Therefore, the IR drop by offset currents on R2 is not sensitive to variations of process, voltage and temperatures (PVT). This means the offset created by R2 (not by D0) will not change due to PVT variations. In the present example, only one of the offset currents can be turned on by switches M0, M3, M4 each time for comparator's trip point adjustment. It is to be appreciated that the switches can be turned on by a binary coded signal such that the offset currents can be additive from 000 (all currents sources off) to 111 (all current sources on). Although a set of 3 switches and 3 offset trim currents is illustrated, for higher precision trimming, more offset trim bits can be employed for more current switches which can be added in parallel with M0, M3 and M4. Another way of implementing offsets to the comparator 56 is to adjust bias currents inside the RCS comparator 56.

Figure 4:
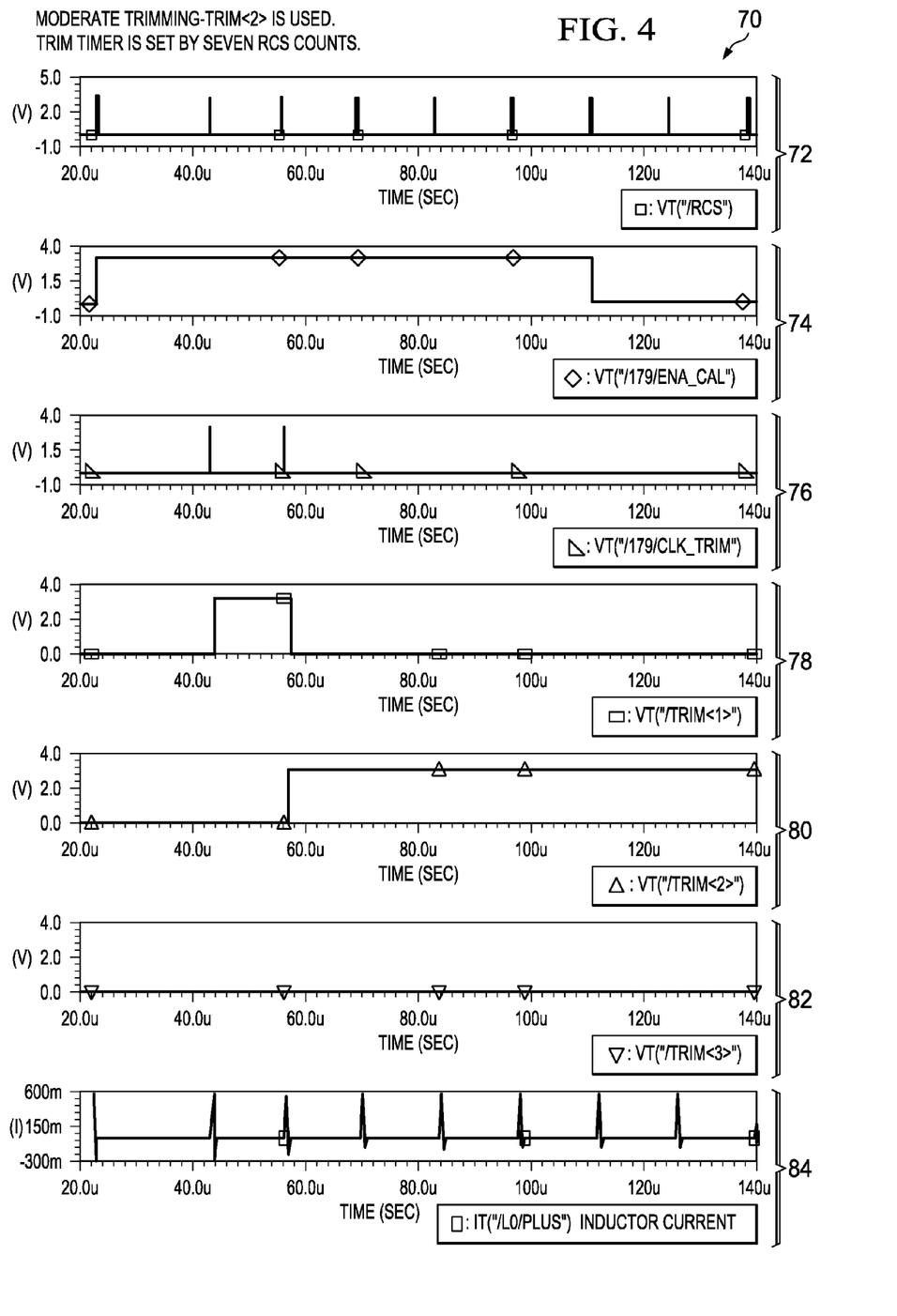
FIG. 4 illustrates a set of waveforms generated by SPICE simulations employing the system and illustrated in FIGS. 1-3.

FIG. 4 illustrates a set of waveforms 70 generated by SPICE simulations employing the system and illustrated in FIGS. 1-3. As illustrated in FIG. 4, a first RCS event (waveform 72) triggers the one-shot timer 42 so signal ENA_CAL goes high (waveform 74). At a second RCS event (waveform 72), the RCS evaluator decides there is reverse current overshoot (see initial large negative spikes in the Inductor current in waveform 84) so the counter 38 advances by 1 count at the CLK TRIM pulse (waveform 76). The decoder 40 thus sets TRIM<1> high (waveform 78). At the third RCS event (waveform 72), the RCS evaluator again detects an overshoot, which is of smaller amplitude (waveform 84) due to the trimming just applied. The RCS evaluator therefore determines that the previously selected TRIM<1> is not sufficient so the counter 38 advances by another count at the second CLK_TRIM pulse (waveform 76). The decoder 40 changes trimming by selecting TRIM<2> (waveform 80). At later 4-7 RCS events (waveform 72), the evaluator decides TRIM<2> setting is adequate because there is no longer large overshoot (waveform 82) (see final small negative spikes in the Inductor current in waveform 84). Automatic calibration is finished at a 7th RCS events indicated by ENA_CAL going low (waveform 74). The counter and trim selection remain unchanged until the regulator powers down.

Figure 5:
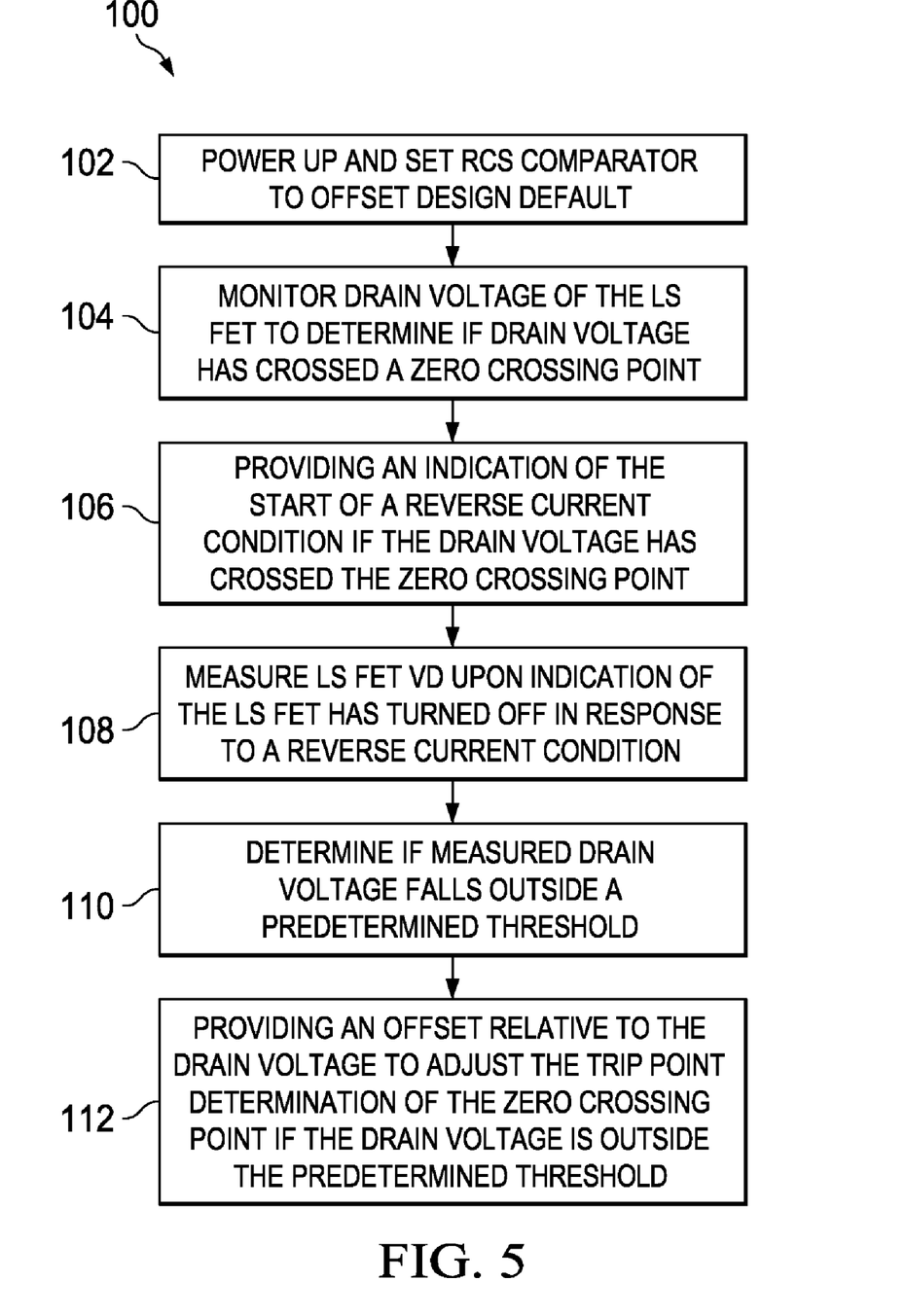
FIG. 5 illustrates an example of a method of calibrating a RCS regulator system in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., analog or digital circuitry, such as may be embodied in an application specific integrated circuit), software (e.g., as executable instructions stored in memory or running on a processor implemented in an ASIC), or any combination of hardware and software.

FIG. 5 illustrates an example of a method 100 of calibrating a RCS regulator system in accordance with an aspect of the invention. The RCS regulator system alternately turns on and off a HS FET and a LS FET to provide an inductor current through an inductor and to charge a capacitor and provide a regulator output voltage to a load. The method 100 begins at 102 where the system is powered up and an offset design default is set to a RCS comparator. At 104, a drain voltage of the LS FET is monitored by the RCS comparator to determine if the drain voltage has crossed a zero crossing point. At 106, an indication is provided at the start of a reverse current condition if the drain voltage has crossed the zero crossing point. At 108, a drain voltage of the LS FET is measured upon receiving an indication that the LS FET has been turned off in response to the indication of the start of a reverse current condition. At 110, a determination of if the measured drain voltage falls outside a predetermined threshold is made and an offset relative to the drain voltage to adjust the trip point determination of the zero crossing point is provided if the measured drain voltage falls outside a predetermined threshold. The methodology 100 can be repeated for a plurality of switching cycles until the measured drain voltage falls within the predetermined threshold or a time out has occurred.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A reverse current sensing (RCS) regulator system comprising:
   a driver logic circuit that switches between alternately turning on and off a high side field effect transistor (HS FET) and a low side field effect transistor (LS FET) to provide an inductor current through an inductor and to charge a capacitor and provide a regulator output voltage to a load;
   a RCS comparator that monitors a drain voltage of the LS FET and is configured to switch states at a zero crossing point to provide an indication of the start of a reverse current condition; and
   a RCS evaluator that measures the drain voltage of the LS FET upon receiving an indication that the LS FET has been turned off by the driver logic circuit and adjusts an offset to the RCS comparator to adjust the trip point of the RCS comparator relative to the drain voltage if the measured drain voltage falls outside a predetermined threshold.

2. The system of claim 1, further comprising an offset generator that provides an offset voltage to the RCS comparator in response to a trim control signal from the RCS evaluator.

3. The system of claim 2, wherein the offset generator comprises:
   a plurality of current sources and respective series coupled trim control transistors being coupled in parallel and connected to one another at a common node;
   a first resistor coupled between the common node and the drain voltage; and
   a first diode having an anode coupled to a first input terminal of the RCS comparator and a cathode coupled to the common node wherein the RCS evaluator can vary the offset to the RCS comparator relative to the drain voltage by varying the selection of the plurality of current sources employing the respective series coupled trim control transistors.

4. The system of claim 3, wherein the offset generator further comprises:
   a second diode having an anode coupled to a second input terminal of the RCS comparator and a cathode coupled to ground through a second resistor;
   a first design default offset current source coupled to the first input terminal of the RCS comparator to provide a first design default offset to the first input terminal;
   a second design default offset current source coupled to the second input terminal of the RCS comparator to provide a second design default offset to the second input terminal wherein the first and second design default offset current sources, the first and second diodes, and the first and second resistors are matched to provide equal offsets to the first and second input terminals of the RCS comparator as the design default offset at initialization of the system.

5. The system of claim 1, wherein the RCS evaluator repeats the measuring of the drain voltage and adjusting the offset to the RCS comparator for each switching cycle until the measured drain voltage falls within the predetermined threshold or a time out has occurred.

6. The system of claim 1, wherein the RCS evaluator comprises:
   a sample and hold circuit that samples the drain voltage of the LS FET upon receiving an indication that the LS FET has been turned off;
   a threshold comparator that compares the measured voltage to a predetermined voltage and provides a logic transition in response to the measured drain voltage falling outside a predetermined threshold, wherein the RCS evaluator adjusts a trip point of the RCS comparator relative to the drain voltage in response to the logic transition.

7. The system of claim 6, wherein the RCS evaluator further comprises:
   an edge detector that generates a clock trim signal that indicates that a logic transition has occurred at the threshold comparator;
   a counter that increments and/or decrements in response to the clock trim signal; and
   a decoder that changes a state of a trim control signal to adjust an offset to the RCS comparator based on an output value of the counter.

8. The system of claim 7, wherein the RCS evaluator repeats the sampling by the sample and hold detector, comparing by the threshold detector, logic transition detecting by the edge detector, counting by the counter and state changing by the decoder to adjust an offset to the RCS comparator for each switching cycle until the measured drain voltage falls within the predetermined threshold or a timer provides an indication that a time out has occurred.

9. The system of claim 1, wherein the RCS evaluator increases the offset to the RCS comparator to adjust the trip point of the RCS comparator relative to the drain voltage if the measured drain voltage falls below a predetermined threshold and the RCS evaluator decreases an offset to the RCS comparator to adjust the trip point of the RCS comparator relative to the drain voltage if the measured drain voltage is above a predetermined threshold.

10. The system of claim 1, wherein the predetermined threshold is set by a current source and a FET that is matched to the LS FET.

11. A reverse current sensing (RCS) regulator system comprising:
  means for alternately turning on and off a high side field effect transistor (HS FET) and a low side field effect transistor (LS FET) to provide an inductor current through an inductor and to charge a capacitor and provide a regulator output voltage to a load;
  means for monitoring a drain voltage of the LS FET and providing an indication of a start of a reverse current condition;
  means for measuring the drain voltage of the LS FET upon receiving an indication that the LS FET has been turned off in response to the indication of the start of a reverse current condition;
  means for determining if the measured drain voltage falls outside a predetermined threshold;
  means for providing a trim control signal if the means for determining determines that the measured drain voltage falls outside the predetermined threshold; and
  means for providing an offset based on the trim control signal to the means for monitoring to adjust the trip point of the means for monitoring relative to the drain voltage.

12. The system of claim 11, wherein the means for monitoring, the means for measuring, the means for determining and the means for providing a trim control signal repeats for each switching cycle until the measured drain voltage falls within the predetermined threshold or a time out has occurred.

13. The system of claim 12, wherein the means for providing a trim control signal comprises means for counting a number of times the measured drain voltage falls outside of the predetermined threshold for a plurality of switching cycles and means for providing the trim control signal based on the count of the means for counting.

14. The system of claim 13, further comprising means for providing a design default offset at initialization of the system.

15. The system of claim 11, wherein the offset relative to the drain voltage is increased if the measured drain voltage falls below a predetermined threshold and/or decreased if the measured drain voltage falls above a predetermined threshold.

16. A method of calibrating a reverse current sensing (RCS) regulator system that alternately turns on and off a high side field effect transistor (HS FET) and a low side field effect transistor (LS FET) to provide an inductor current through an inductor and to charge a capacitor and provide a regulator output voltage to a load, the method comprising:
  monitoring a drain voltage of the LS FET to determine if the drain voltage has crossed a zero crossing point;
  providing an indication of the start of a reverse current condition if the drain voltage has crossed the zero crossing point;
  measuring the drain voltage of the LS FET upon receiving an indication that the LS FET has been turned off in response to the indication of the start of a reverse current condition;
  determining if the measured drain voltage falls outside a predetermined threshold; and
  providing an offset relative to the drain voltage to adjust the trip point determination of the zero crossing point if the measured drain voltage falls outside a predetermined threshold.

17. The system of claim 16, wherein the monitoring, providing, measuring, determining and providing is repeated for each switching cycle until the measured drain voltage falls within the predetermined threshold or a time out has occurred.

18. The system of claim 17, further comprising counting a number of times the measured drain voltage falls outside of the predetermined threshold for a plurality of switching cycles and providing the offset based the count.

19. The system of claim 16, further comprising providing a design default offset at initialization of the method.

20. The system of claim 16, wherein the offset relative to the drain voltage is increased if the measured drain voltage falls below a predetermined threshold and/or decreased if the measured drain voltage falls above a predetermined threshold.

* * * * *